Figures 1, 2:
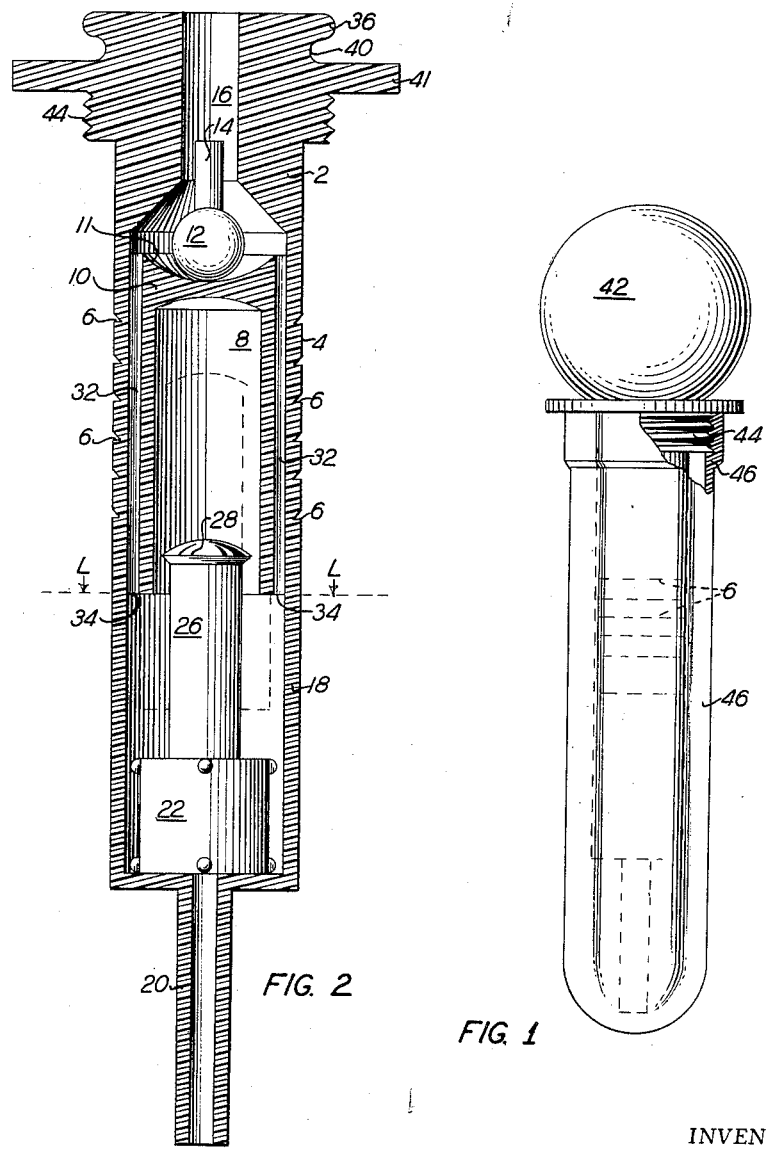

Sept. 14, 1954     F. J. TRAINOR     2,688,867
SPECIFIC GRAVITY INDICATOR
Filed Feb. 23, 1949

INVENTOR.
FOSTER J. TRAINOR
BY
*Fisher & Christen,*
ATTORNEYS.

Patented Sept. 14, 1954

2,688,867

UNITED STATES PATENT OFFICE 2,688,867

SPECIFIC GRAVITY INDICATOR

Foster J. Trainor, Holly Hill, Fla.

Application February 23, 1949, Serial No. 77,915

3 Claims. (Cl. 73—33)

This invention is a specific gravity indicator for quickly and accurately measuring the specific gravity of liquids.

One of the most important objects of the invention is to provide a specific gravity indicator in which the liquid level in the float chamber is constant. As the result of this, the specific gravity calibrations, instead of being on the float, as is usually the case, are on the body of the instrument, preferably on the outside, where they may be quickly and accurately read.

Another important feature of the invention is the float itself, which is preferably made of a solid synthetic plastic, of a type that would not be affected by the liquid being tested, the material used being selected so that it has a coefficient of expansion substantially the same as the coefficient of expansion of the liquid being tested, whereby temperature changes are automatically compensated for. One possible material for the float is a polyethylene plastic having a specific gravity of about 0.95. This float preferably comprises a body portion, and an upwardly extending stem having a reference point or line thereon, cooperating with the calibrations on the outside of the instrument. Such a float can be made with great accuracy, so accurately that little or no calibration of the instrument is necessary.

The specific gravity indicator is preferably made of a synthetic resin such as transparent acid resisting polystyrene.

The specific gravity indicator of this invention is small, compact and durable and being made of plastic is not shatterable like glass. However, a protective casing of non-shatterable plastic may be used, if desired.

More specifically, this invention comprises a head portion at the top of the instrument, below which is a calibrated zone, calibrated in terms of specific gravity. Positioned within the instrument, in the same zone or level as the calibrations, is a downwardly opening air chamber. Below the air chamber is a float chamber and below the float chamber is the usual suction nozzle for drawing in liquid to be tested. Just above the air chamber is an upwardly closable check valve, so that the liquid will not be sucked up into the suction bulb, whereby the bulb is protected against deterioration from such liquid.

A very important feature of the invention is a by-pass from the float chamber up to the suction opening in the head. When suction is applied to the head, liquid flows into the float chamber and fills it to the level of the lower end of the by-pass, and the liquid level is maintained at this point. Liquid cannot enter the air chamber on account of the air pocket therein. Liquid is drawn into the instrument until the check valve closes and no more can be drawn in, the liquid level still remaining as just described.

The stem of the float extends into this air chamber and is provided with a reference line or point which cooperates with the specific gravity calibrations on the body of the instrument for reading the gravity, the transparency of the material permitting such readings.

Further advantages of the structure and operation will be described in connection with the accompanying drawings, wherein:

Fig. 1 is a side elevation of the specific gravity indicator, with its protective casing in place; and Fig. 2 is an enlarged view in vertical cross section, with the protective casing removed.

Referring now to these drawings, the instrument comprises a head portion 2 and a calibrated portion 4, below the head portion, provided with calibrations 6 in terms of specific gravity. However, it is evident that these calibrations could read in freezing points, for example, if the instrument is to be used for testing the effectiveness of anti-freeze solutions, as will be evident to one skilled in the art.

Positioned within the instrument and in the same zone or level as the calibrations 6, is a downwardly opening air chamber 8. The top 10 of the air chamber is provided with a concave seat 11 on which rests a check valve 12 in the form of a float. Check valve 12 is preferably made of solid plastic material such as polyethylene. This float is provided with a guiding stem 14 projecting into a passage 16 opening out through the top of the head 2.

The float chamber 18 is positioned, as shown, below the air chamber 8 and is provided with the usual suction nozzle 20 of rigid or flexible material, such as polystyrene or rubber. The main body of the float, shown at 22, is provided with an upwardly extending stem 26 formed to provide a reference point or line 28 which reference point or line cooperates with the calibrations 6, which are visible through the transparent walls of the air chamber 8.

One or more by-pass ducts 32 are provided, the lower ends of the ducts, as at 34, opening into the float chamber 18, while the upper ends of the ducts open into the space around the check valve 12.

The head 2 of the instrument is provided with a bead 36 defining an annular groove 40 and with a bordering flange 41. A compressible ball 42 has a beaded opening which snaps into the groove 40, making a tight joint, so that when the ball is squeezed and released, suction is applied to the interior of the instrument in the usual way to suck up liquid therein.

The operation is as follows: When the ball 42 is compressed and released, the liquid to be tested is drawn into and fills the float chamber 18, the suction also drawing the liquid through the by-pass ducts 32, and around the check valve 12, which floats uwardly and seals passage 16 so that no liquid will get into the ball, thereby protecting the ball from corrosive acids and alkalies. The liquid will rise in the float chamber 18 to the level of the lower ends of the by-pass ducts 32, this liquid level being indicated by the line L—L. No liquid rises into the air chamber 8 because of the air pocket therein. All the parts are now at atmospheric pressure and so no correction need be made for this factor. The float 22 floats in its float chamber, the specific gravity being read by the position of the line or reference point 28 on the stem 26 of the float, with reference to the calibrations 6 on the outside of the instrument. The liquid is released by squeezing the bulb 42, which pushes down the check valve 12 and allows the liquid to flow out pipe 20.

The head 2 of the instrument is conveniently provided with exterior threads 44. A protective casing 46 of some non-shatterable plastic, such as polystyrene, is provided with interior threads and is detachably engageable with the threads 44. Any other type of detachable coupling may, of course, be used in place of the threads.

There has thus been provided a specific gravity indicator of plastic material which is resistant to the action of the fluid being tested, which requires only a small amount of fluid for test purposes, and which is extremely accurate, because of the constant liquid level position maintained in the instrument, in cooperation with a float of plastic material which can be manufactured with great precision and of a material having an accurately known specific gravity. Since no liquid enters into the air chamber 8, it is always clear and the reference point 28 on the float is always clearly visible with relation to the calibrations 6. The vertical ducts 32 do not form an annular passage all around the air chamber 8, so that reference line 28 is always clearly visible through the transparent wall of the air chamber 8. Since no liquid intervenes between the mark 28 on the float and the calibrations 6 on the casing, the device can be used for measuring the specific gravities of liquids which are partially or completely opaque.

While the preferred construction has been described in some detail, it should be understood that the invention may be carried out in other ways, as falling within the scope of the appended claims.

I claim as my invention:

1. A specific gravity indicator comprising a casing for holding the liquid tto be measured, said casing being made of clear plastic material and being provided with an inverted, downwardly opening air chamber in the upper part thereof, and with a relatively narrow liquid by-pass around said air chamber, the outside of the casing being provided with calibrations thereon in the zone of said air chamber, and a precision molded, one-piece float made of a homogeneous solid plastic having a specific gravity slightly less than that of the liquid being tested and having a coefficient of expansion substantially equal to that of the liquid being measured, said float having a stem projecting into said air chamber, said stem having a mark thereon adapted to cooperate with said calibrations on the outside of the casing, said mark being readable through the solid clear plastic of the casing.

2. A specific gravity indicator comprising a casing for holding the liquid to be measured, said casing being made of clear plastic material and being provided with an inverted, downwardly opening air chamber in the upper part thereof, and with a relatively narrow liquid by-pass around said air chamber, the outside of the casing being provided with calibrations thereon in the zone of said air chamber, and a precision molded, one-piece float made of plastic material having a stem projecting into said air chamber, said stem having a mark thereon adapted to cooperate with said calibrations on the outside of the casing, said mark being readable through the solid clear plastic of the casing, said casing being provided with a recess in the interior of the upper end thereof above said air chamber and in communication with said liquid by-pass, the wall defining the upper part of said recess being adapted to serve as a valve seat, and a one-way float valve in said recess cooperating with said valve seat.

3. The combination as set forth in claim 2 wherein said precision-molded float is an integral homogeneous solid mass, made of a polyethylene plastic having a coefficient of expansion substantially equal to that of the liquid being measured.

References Cited in the file of this patent

UNITED STATES PATENTS

| Number | Name | Date |
|---|---|---|
| 745,942 | Wickins | Dec. 1, 1903 |
| 1,304,115 | Steiner | May 20, 1919 |
| 1,790,696 | Bridge | Feb. 3, 1931 |
| 1,935,564 | Christie et al. | Nov. 14, 1933 |
| 1,964,145 | Edelmann | June 26, 1934 |
| 2,320,417 | Edelmann | June 1, 1943 |
| 2,393,522 | Edelmann | Jan. 22, 1946 |
| 2,537,825 | Hardin | Jan. 9, 1951 |